United States Patent [19]
Staber et al.

[11] Patent Number: 6,137,866
[45] Date of Patent: Oct. 24, 2000

[54] INDOOR XDSL SPLITTER ASSEMBLY

[75] Inventors: Harley J. Staber, Coppell; John A. Keenum, Keller; Todd C. Lanquist, Trophy Club; Chad M. Kerr, Bedford, all of Tex.

[73] Assignee: Siecor Operations, LLC, Hickory, N.C.

[21] Appl. No.: 09/085,657

[22] Filed: May 28, 1998

[51] Int. Cl.[7] .......................... H04M 11/06; H04M 1/253
[52] U.S. Cl. ................................ 379/93.06; 379/93.09; 379/399
[58] Field of Search ................ 379/90.01, 93.05, 379/93.06, 93.09, 326, 327, 328, 399

[56] References Cited

U.S. PATENT DOCUMENTS

| | | | |
|---|---|---|---|
| 5,408,260 | 4/1995 | Arnon | 348/6 |
| 5,440,335 | 8/1995 | Beveridge | 348/13 |
| 5,469,495 | 11/1995 | Beveridge | 379/56 |
| 5,623,542 | 4/1997 | Schneider et al. | 379/399 |
| 6,026,160 | 2/2000 | Staber et al. | 379/399 |

OTHER PUBLICATIONS

John Cook and Phil Sheppard, "ADSL and VADSL Splitter Design and Telephony Performance," IEEE Journal on Selected Areas in Communications, vol. 13, NO. 9, p. 1634–1642, Dec. 1995.

Marlis Humphrey and John Freeman, "How xDSL Supports Broadband Services to the Home," IEEE Network, vol. 11, No. 1, p. 14–23, 1+2/1997.
A1000 ADSl REmote Spittler (LPFR) installation (with Guideslines for In–home Wiring); Alcatel Telecom; A9693; 3EC 15158 AAAA TCZZA–Ed. 01.

Primary Examiner—David R. Hudspeth
Assistant Examiner—Tálivaldis Ivars Šmits

[57] ABSTRACT

An apparatus and method for mounting an xDSL signal splitter that is readily interconnected with existing indoor premises telephone wiring to provide separate access to voice and data signals by the subscriber. The apparatus comprises three pairs of terminations for connection of combined signal wiring, first signal wiring and second signal wiring. A first splitter circuit is mounted in the housing and electrically connected between the first pair of terminations and the second pair of terminations. A first signal jack extends through the exposed surface of the housing and is connected to receive only the first signal. In an alternative embodiment, the third pair of terminations is electrically connected to a branch point between the first pair of terminations and the first splitter circuit. In another alternative embodiment, a second splitter circuit is mounted in the housing and electrically connected between the branch point and the third pair of terminations. A second signal jack extends through the exposed surface of the housing and is connected to receive only the second signal.

29 Claims, 8 Drawing Sheets

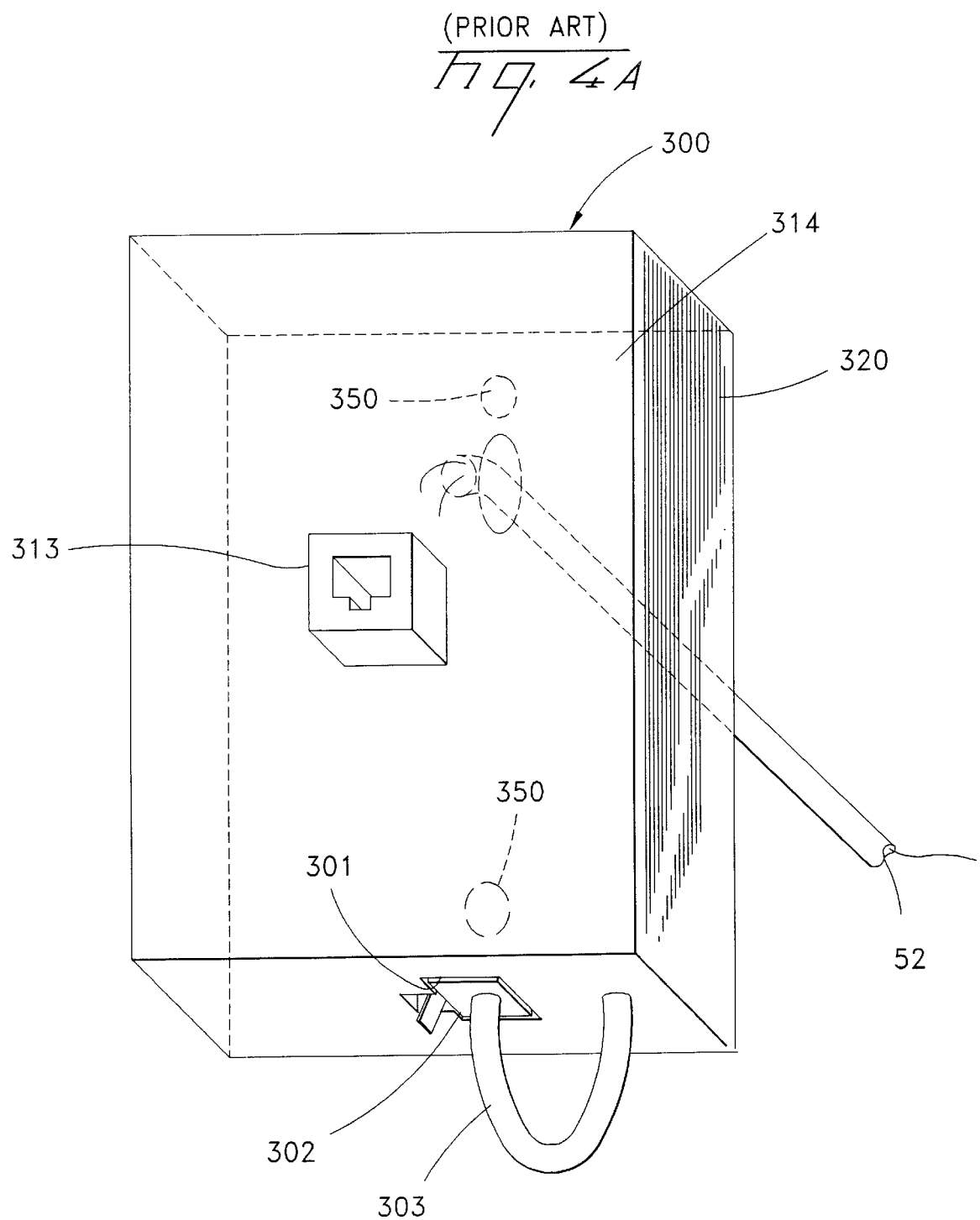

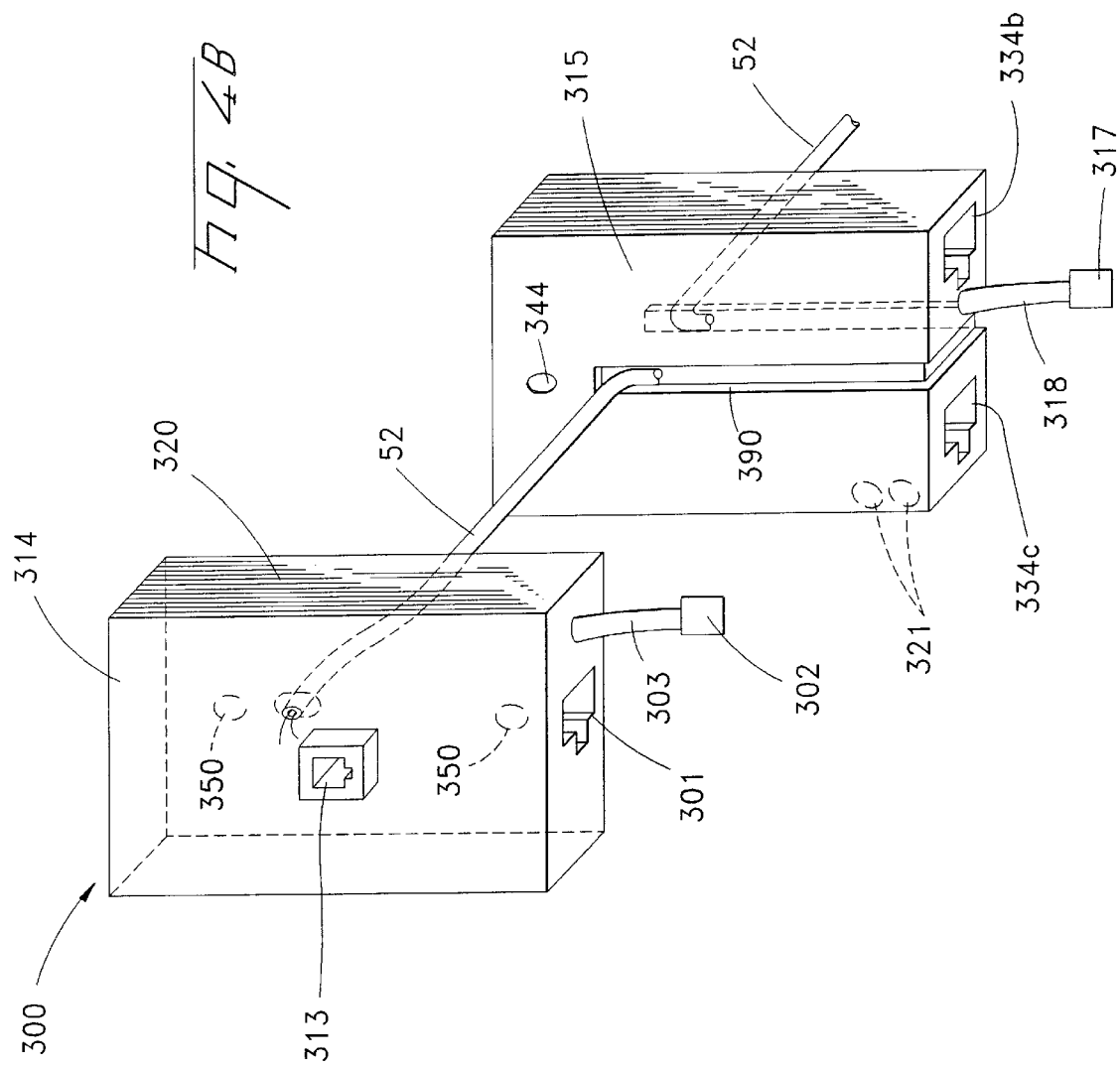

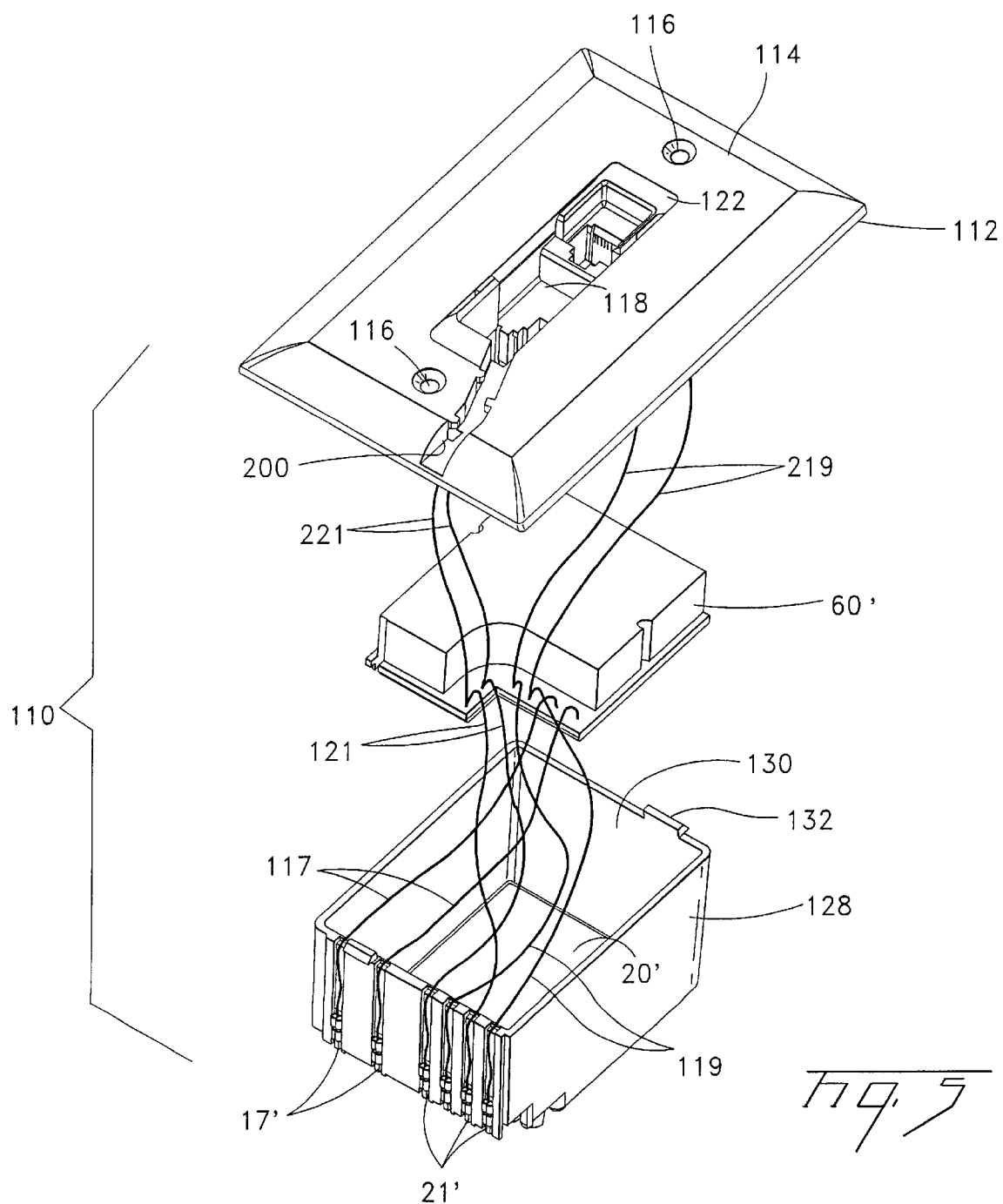

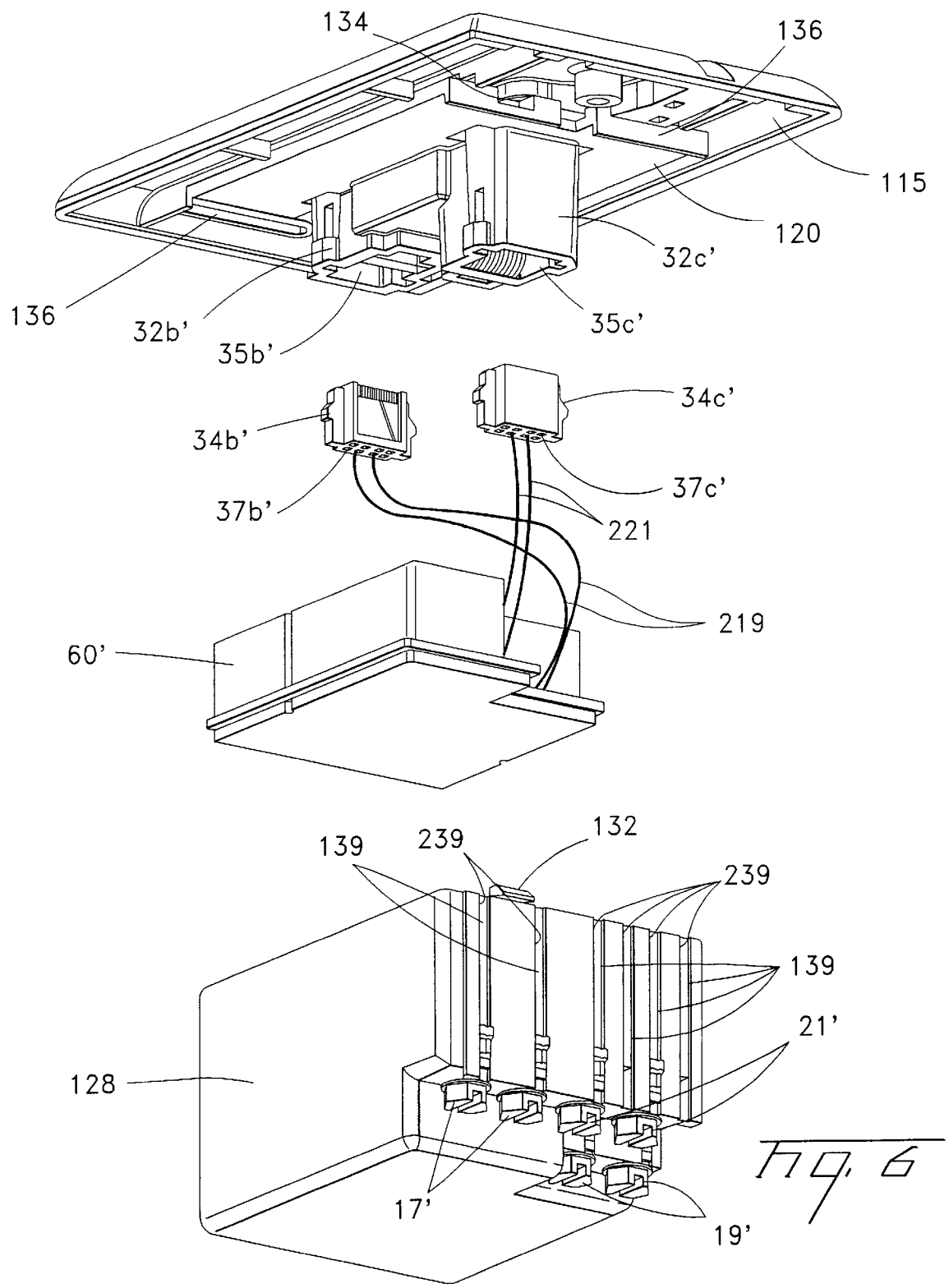

INDOOR XDSL SPLITTER ASSEMBLY

FIELD OF THE INVENTION

The present invention relates to an indoor xDSL assembly with an xDSL splitter circuit that is interconnectable with existing indoor telephone installations to split a first signal, for example a telephone signal, from a combined signal transmitted over one outside wire pair.

BACKGROUND OF THE INVENTION

ADSL (Asymmetric Digital Subscriber Line) is a modem technology that transmits multimedia and high speed data over existing twisted-pair telephone lines concurrently with Plain Old Telephone Service (POTS) signals. VDSL is a higher speed variation of ADSL. The multimedia and high speed data are at a higher frequency than the POTS signals, and components have been developed that can split the higher frequency multimedia and/or data from the lower frequency POTS signal and/or vice versa at either end of the transmission path. IDSL is a variation wherein the multimedia and/or high speed data is transmitted concurrently with an ISDN signal instead of the POTS signal. The ISDN signal, while at a higher frequency than the POTS signal, is at a lower frequency than the multimedia or high speed data signal. Other variations may exist or be developed where signals of differing frequencies are transmitted over existing twisted-pair wiring to a subscriber. The term xDSL will be used herein to refer generically to these different versions of transmitting higher frequency signals (e.g. ADSL, VDSL, etc.) over twisted pair concurrently with a relatively lower frequency signal (e.g., POTS, ISDN, or out-of-band signaling used in special services). The terms "first signal" and "second signal" will be used herein to refer generically to at least two different frequency signals transmitted concurrently over twisted-pair wiring that are intended to be separated, or split, at the subscriber. The term "combined signals" will be used to refer to both the first and second signals combined over a line.

An xDSL architecture connects an xDSL modem on each end of a twisted-pair telephone line, that is, at the "central office" (or node or remote terminal) and at the premises of the subscriber (or customer). The terms "splitting" or "splitter" are used to refer to a circuit or component, for example, a low pass filter or low pass and high pass filter combination, that separates the first signal from a combined signal, in the example of a low pass filter, and that separates both the first and second signals from the combined signal in the example of the low pass and high pass filter combination. Components other than low pass and high pass filters may exist or be developed that also perform this splitting function. The particular structure and nature of the various splitter circuits or components are not necessary to the present invention other than the fact that they "split" the combined signal and are interconnected into an xDSL network in some manner at the customer end of the network.

Co-pending applications Ser. Nos. 09/001,565 and 09/001,678 which issued on Feb. 15, 2000, as U.S. Pat. No. 6,026,160, disclose splitter modules for use in the Network Interface Device (NID) typically located on the outside of the subscriber residence. It may be desired to locate the splitter inside the residence and therefore a need exists for appropriate packaging of the splitter such that it can be readily interconnected with existing inside telephone wiring installations.

Existing inside, or premises, wiring installations typically comprise two twisted wire pairs routed throughout the premises ("red/green" and "yellow/black") with typically only the red/green actually wired to the various wall jacks in the home. In some existing installation, an "indoor is NID" is used that appears generally like a common wall jack face and faceplate but additionally includes a demarcation plug and jack. U.S. Pat. Nos. 4,488,008, 4,647,725 and Des. No. 275,667 show examples of indoor NIDs that are specifically designed for use indoors to mount in a wall and appear somewhat like a telephone outlet face plate. Indoor NIDs are especially appropriate for use in apartment buildings and other locations where protection is provided in Building Entrance Terminals.

A splitter sold by Alcatel under the designation "A1000 ADSL Remote Splitter" is disclosed as being installed in an outdoor NID. This splitter has a wire pair pigtail for being connected to the wire pair carrying the combined signal and two pairs of screw terminals for connection to two wire pairs, each carrying a respective one of the first or second signals from the splitter. The Alcatel splitter is not readily used indoors by itself in that hard wiring of the pigtail and screw terminals is a cumbersome process and it is not apparent how the splitter would be interconnected with existing indoor telephone wiring installations or how the splitter would be protected from casual contact or physical damage.

A need exists for an xDSL splitter module that can be readily interconnected with existing indoor telephone wiring installations and provide protection from casual contact and physical damage.

SUMMARY OF THE INVENTION

One aspect of the present invention is a premises signal splitter assembly for receiving a combined telecommunications signal of at least a first signal and a second signal and adapted for mounting within a premises. The assembly comprises a housing adapted for being mounted within the premises. The housing has an exposed surface that is visible when the housing is mounted and a back portion that is not visible when the housing is mounted. The housing defines an interior. The assembly further comprises first, a second and a third pair of electrical terminations. The first pair of electrical terminations is adapted to receive the combined telecommunications signal. A splitter circuit card is mounted in the interior of the housing and carries a first splitter circuit electrically connected in series between the first pair of terminations and the second pair of terminations to pass only the first signal of the combined signal from the first pair of terminations to the second pair of terminations. The third pair of terminations is electrically connected to a branch point between the first pair of terminations and the first splitter circuit. A first signal jack extends through the exposed surface of the housing, and the first signal jack is electrically connected to the second pair of terminations. According to another aspect of the present invention, the premises signal splitter assembly further comprises a build-out assembly adapted for mounting in combination with a premises NID.

Another aspect of the present invention is a method of incorporating an xDSL splitter into a premises telephone wiring installation having a first wire pair for carrying a combined signal of at least a first signal and a second signal. According to the method, a signal splitter assembly is mounted within the premises. The splitter assembly comprises a housing having an exposed surface that is visible when the assembly is mounted and a back portion that is not visible when the assembly is mounted. The housing defines an interior. A first, a second and a third pair of electrical terminations are associated with the housing and a splitter circuit card is mounted in the interior of the housing and carries a first splitter circuit electrically connected in series between the first pair of terminations and the second pair of terminations to pass only the first signal of the combined signal from the first pair of terminations to the second pair of terminations. The third pair of terminations is electrically connected to a branch point between the first pair of terminations and the first splitter circuit. A first signal jack extends through the exposed surface of the housing and is electrically connected to the second pair of terminations. Further according to the method, the first wire pair is connected to the first pair of terminations and a telecommunications plug is inserted into the first signal jack.

BRIEF DESCRIPTION OF THE DRAWINGS

FIG. 4A is a perspective view of a conventional premises NID.

FIG. 4B is a perspective view of a third embodiment of a premises signal splitter assembly of the present invention shown with the premises NID of FIG. 4A.

FIG. 5 is a perspective view of a second embodiment of a premises signal splitter assembly of the present invention;

FIG. 6 is an exploded perspective view from the rear of the assembly of FIG. 5;

DETAILED DESCRIPTION OF THE PREFERRED EMBODIMENT

Figure 1:
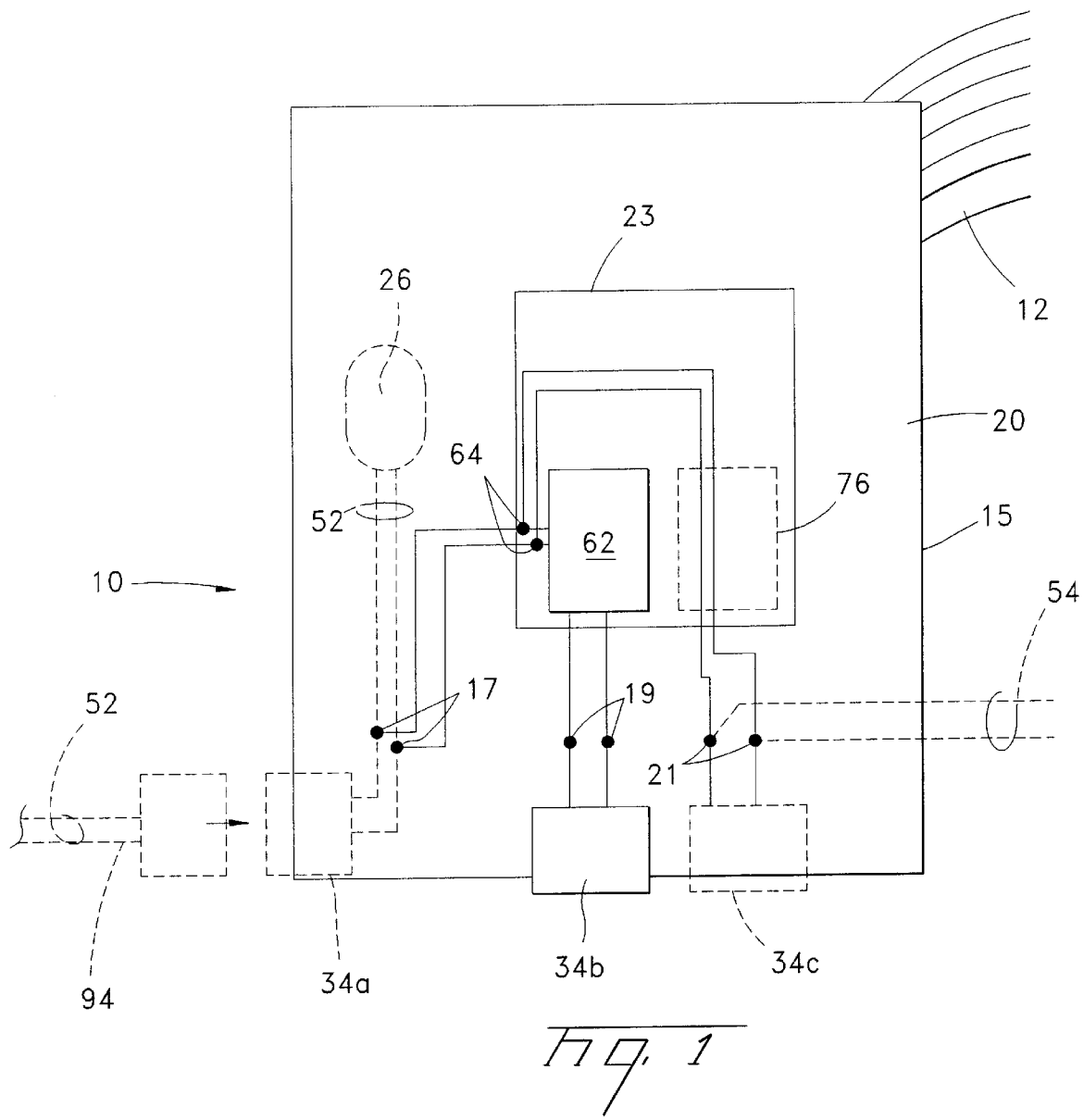
FIG. 1 is a general schematic of a premises signal splitter assembly of the present invention.

The present invention relates to a wall mountable assembly that contains a splitter circuit that is readily interconnected with premises telephone wiring. The premises wiring has a first wire pairs that carries a combined telecommunications signal of at least a first and a second signal. With reference to FIG. 1, a generic schematic diagram of assembly 10 is shown that is incorporated in various embodiments of the present invention that will be described herein. Assembly 10 has housing 15 that is adapted for being mounted to wall 12 (or other surface in a premises), for example, by screws or other suitable fastening mechanism. Not shown in the schematic of FIG. 1 but as will be apparent from other figures, housing 15 has an exposed surface that is visible when the housing is mounted and a back portion that is not visible when the housing is mounted.

Housing 15 has carried thereon first pair of electrical terminations 17, second pair of electrical terminations 19 and third pair of electrical terminations 21. Splitter circuit card 23 is mounted in the interior 20 of housing 15 and has first splitter circuit 62 electrically connected in series between first pair of terminations 17 and second pair of terminations 19. In use, first pair of terminations 17 is connected in some manner to the first wire pair of the premises telephone wiring. Two examples are shown in phantom in FIG. 1: one example is by connecting first pair of terminations 17 to combined signal jack 34a mounted in housing 15 and extending through the exposed surface of the housing. First wire pair 52 comprises a telephone wire jumper 94 connected between combined signal jack 34a and an existing telephone wall jack. Another example is by having housing 15 define hole 26 through which the first wire pair 52 can be routed and connected to first pair of terminations 17 (See FIG. 3). Another example, not shown, is to have first pair of terminations 17 connected to a telephone plug that extends from a short pigtail from housing 15 and that can be connected to an existing wall jack when housing 15 is either mounted close to the existing wall jack or over the existing wall jack. Longer mounting screws or bolts can be used to mount housing 15 over an existing wall jack and thereby reduce the number of visible wall mounted outlets in a premises.

First signal jack 34b is mounted on housing 15, extends through the of housing 15 and is electrically connected to second pair of terminations 19. The first signal may be the POTS signal and first signal jack 34b can be a standard RJ-11 jack to provide a readily usable connection point for the subscriber to connect its telephone with the POTS signal after it is split from the combined signal. Alternatively, second pair of terminations 19 may be accessed by the subscriber by means of the other connections described above for first pair of terminations 17.

Third pair of terminations 21 is electrically connected to branch point 64 between first pair of terminations 17 and first splitter circuit 62. Branch point 64 could also be at first pair of terminations 17. Additionally, second signal jack 34c may also be mounted in housing 15 and extend through the exposed surface of the housing for ready access by the subscriber. The second signal may be a data signal for a computer in the premises and second signal jack 34c can be a readily used RJ-45 (or RJ-11, RJ-14, etc.) jack. Alternatively, third pair of terminations 21 may by hard wired directly to the desired point by wires 54, or otherwise as described above for first pair of terminations 17. There may not be a need to split the second signal from the combined signal; however, if it is desired to split the second signal from the combined signal, a second splitter circuit 76 can be added to circuit card 23 to pass only the second signal from first pair of terminations 17 to third pair of terminations 21.

In addition, multiple wire pairs may be wired to one or more of first, second and third pairs of terminations 17, 19, 21 depending on the desired wiring scheme for a given premises wiring installation. As one example, multiple wire pairs may be terminated at second pair of terminations 19 in addition to first signal jack 34b and routed through hole 26 and throughout the premises to various POTS wall jacks around the premises. This generic arrangement and variations and additions can be incorporated in various mountable assemblies.

Figure 2:
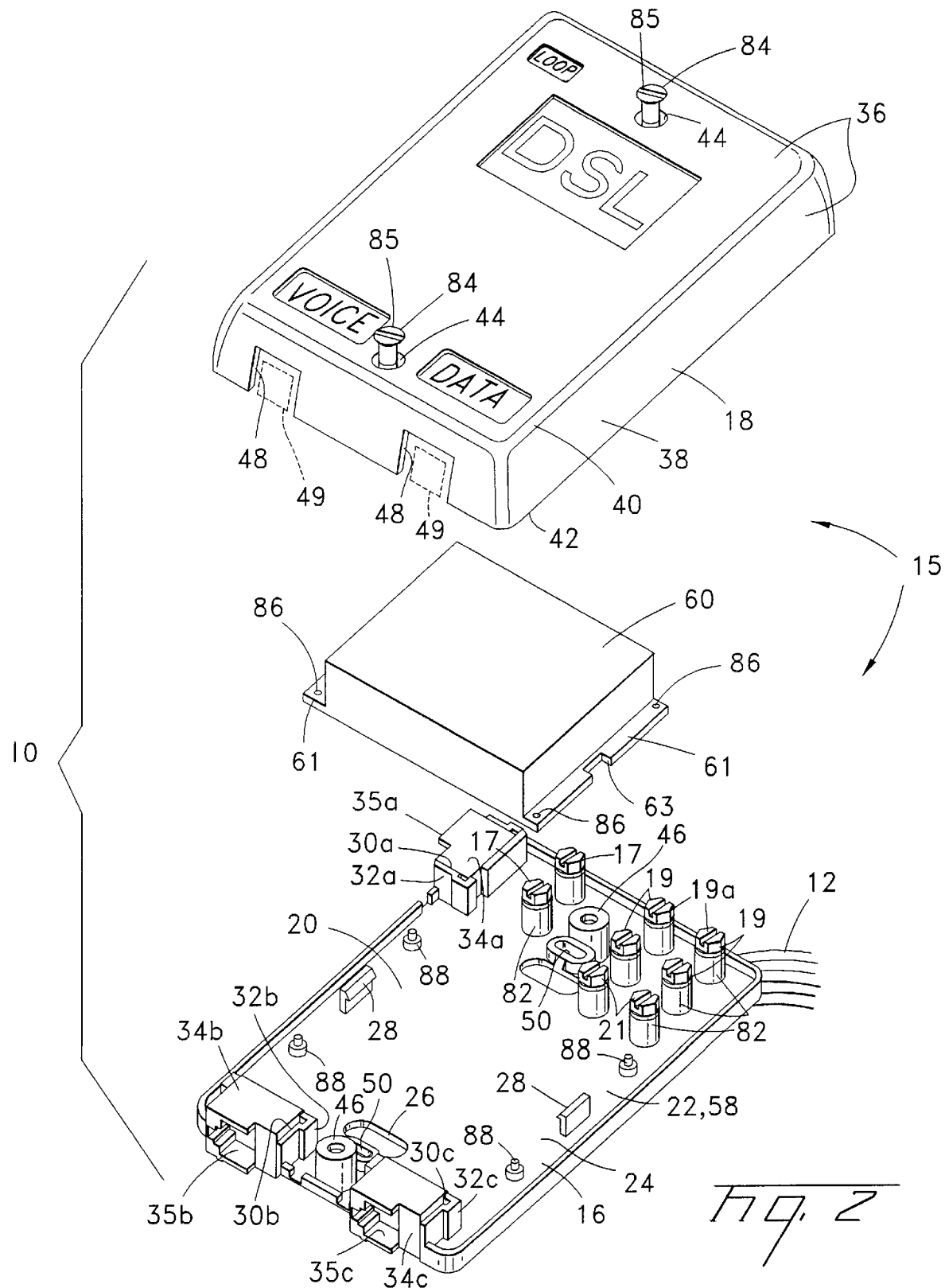
FIG. 2 is an exploded perspective view of a first embodiment of a premises signal splitter assembly of the present invention.
Figure 3:
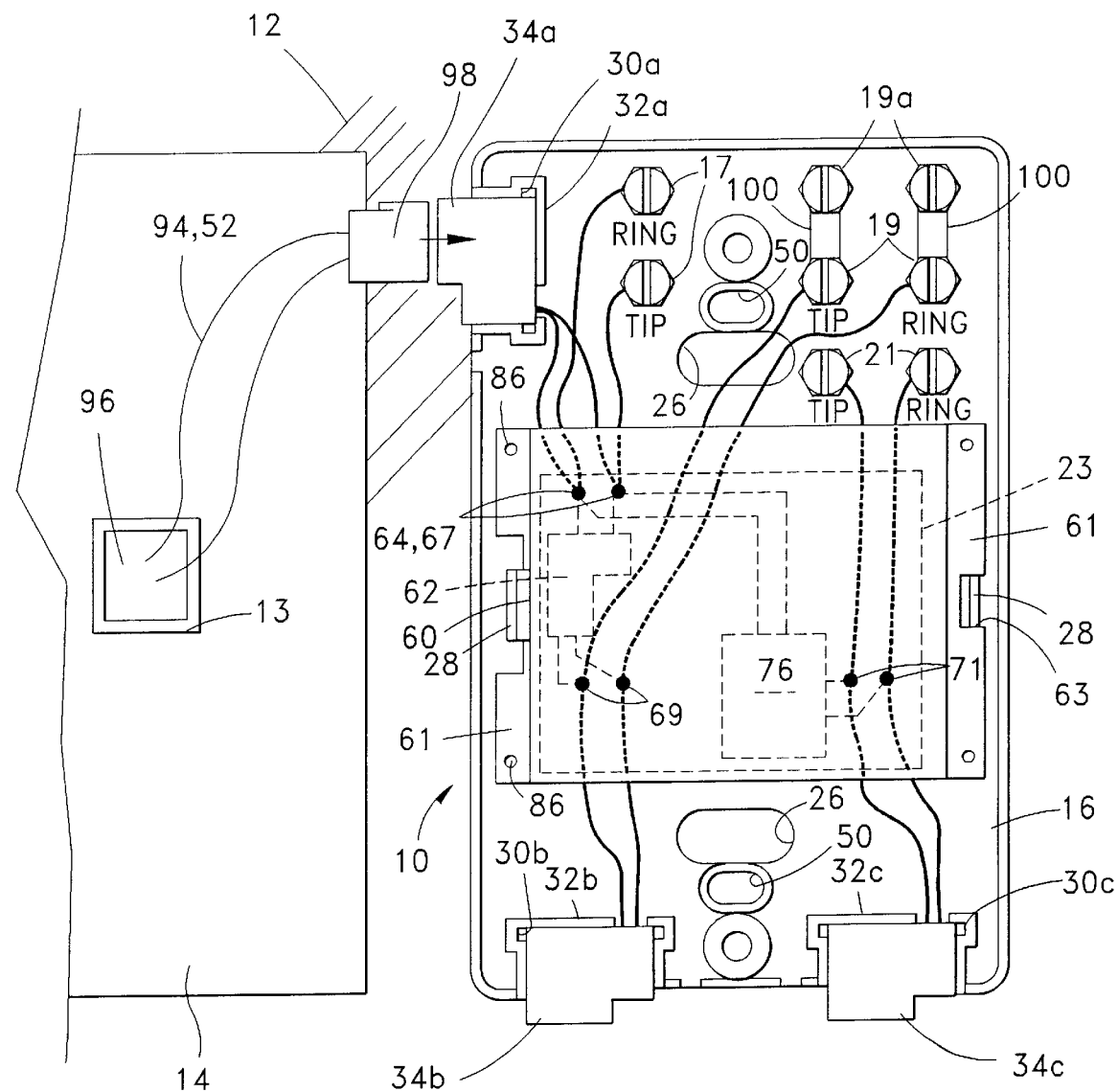
FIG. 3 is a view/wiring diagram of the assembly of FIG. 2.

With reference to FIGS. 2–3 a first embodiment of assembly 10 is shown for mounting on wall 12 (or other surface in a premises) preferably near existing telephone wall jack 13 and faceplate 14 shown in part. Assembly 10 has housing 15 which is two pieces in this embodiment comprising base 16 and cover 18 that fits over base 16 to define interior 20. Housing 15 has back portion 58 that is not visible when housing 15 is mounted to wall 12 comprising in this embodiment back surface 22 of base 16. Back surface 22 is disposed against wall 12 when module 10 is mounted to wall 12. Base 16 also has inside surface 24 opposite back surface 22. Base 16 defines holes 26 therethrough to allow passage of wires from wall 12 into interior 20.

Alternatively, breakouts formed in side walls 38 of cover 18 may be provided to enable routing of wires for surface wiring as opposed to in-wall wiring through holes 26.

Cover 18 is attached to base 16 by screws 84 that extend through screw holes 44 in cover 18 and into cover posts 46 extending from base 16. Screws 84 preferably screw into pre-tapped metal inserts mounted in the cover posts 46 for ease of assembly (or screws 84 may self tap into posts 46). A customer option is to use spacers with screws 84 such that heads 85 of screws 84 are spaced above the front face of exposed surface 36. As such, screws 84 can receive a wall mountable phone hung thereon if desired. Any other suitable attachment means may be used for attaching cover 18 to base 16, for example, screws, snap fit structures, sliding engagement structures, hinged attachment, etc. Base 16 is mounted to wall 12 by an appropriate fastener through mounting holes 50. Base 16 has jack mounting locations 30a,b, c each of which are defined by jack supports 32a, b, c, respectively extending vertically from inside surface 24 of base 16 which are dimensioned to slidably receive jacks 34a,b, c, respectively.

Housing 15 has an exposed surface that is visible when housing 15 is mounted to wall 12 comprising in this embodiment exposed surface 36 of cover 18. Cover 18 has side walls 38 extending generally vertically from periphery 40. Side walls 38 have free edge 42 which is preferably located over base 16 and against wall 12 upon attachment of cover 18 to base 16. Exposed surface 36 of cover 18 defines screw holes 44 which align over cover posts 46 extending from base 16 to allow for mounting of cover 18 to base 16. Mounting holes 50 protruding through base 16 allow base 16 (and assembly 10) to be mounted to wall 12 or a standard electrical box (not shown) pre-installed into wall 12, or otherwise mounted within a premises. Side walls 38 of exposed surface 36 define cut-outs 48 which are located to provide an opening for each of the jacks 34a,b, and c so that they are accessible from the exterior of module 10 to have plugs inserted and removed therefrom. Jacks 34a, 34b, and 34c each have cavities 35a, 35b and 35c opening outward in a direction parallel with wall 12. Cut-outs 48 may include break-outs 49 removal during installation.

Splitter module 60 is located in interior 20 defined by base 16 and cover 18. Module 60 has flanges 61 with notches 63 that are snap engaged by latch arms 28 extending from base 16. Splitter module 60 also has flange 61 with mounting holes 86 spaced to be located over mounting posts 88 extending from base 16. Splitter module 60 has splitter circuit card 23 mounted therein with first splitter circuit 62 which may comprise a low pass filter. First splitter circuit 62 is connected in series between first contacts 67 (which double as branch points 64 in this embodiment) and second contacts 69. First terminations 17 and combined signal jack 34a are connected to first contacts 67. Second terminations 19 and first signal jack 34b are connected to second contacts 69. First splitter circuit 62 is designed to pass only first signals from first contacts 67 to second contacts 69 when a combined signal is transmitted to first contacts 67. Splitter module 60 can also include second splitter circuit 76, which may comprise a high pass filter, connected in series between branch points 64 and third contacts 71. Third terminations 21 and second signal jack 34c are connected to third contacts 71 so as to pass only the second signal from branch points 64 to third contacts 71 when a combined signal is transmitted to branch points 64. As an alternative, jacks 34a,b,c could be connected directly to terminations 17, 19, 21, respectively, as shown in FIG. 1 instead of via contacts 67, 69, 71 respectively, on circuit card 23.

In operation, first wire pair 52 in the premises wiring installation that is to carry the combined signal is connected to first contacts 67 by inserting first plug 96 of jumper 94 into wall jack 13 shown with faceplate 14 and inserting second plug 98 into combined signal jack 34a. If it is desired to route combined signal wiring from assembly 10 to other locations in the premises, wire pairs can be connected to first terminations 17 as desired. As an alternative, first wire pair 52 is not extended by jumper 94 but instead is routed through hole 26 to first pair of terminations 17. As such, combined signal jack 34a may not be used. Additional wiring can still be connected to first pair of terminations 17 because the preferred terminations can have multiple pairs of wires connected thereto. First, second and third pairs of terminations 17, 19, 21 may comprise self tapping screws that screw into a respective one of a plurality of terminal posts 82 or pre-tapped metal inserts mounted therein. One commercial example of such a terminal is referred to as a SEMS assembly (thread forming screws with captive washers).

First signal jack 34b is available for the subscriber to connect equipment that receives the first signal, for example, a telephone to receive a POTS signal. If it is desired to wire additional first-signal-only jacks in the premises from assembly 10, additional wire pairs can be connected to second terminations 19 and routed as desired. The embodiment of FIGS. 2–3 additionally includes additional second terminations 19a electrically connected to second terminations 19 by shorting bars 100 to provide additional wire connection capacity. Second signal jack 34c is available for the subscriber to connect equipment that receives the second signal, for example, a computer to receive a data signal. If it is desired to wire additional second-signal-only jacks in the premises from assembly 10, additional wires can be connected to third terminations 21 and routed as desired. The location and orientation of jacks 34a,b,c and the location of terminations 17,19,21 can be rearranged to accommodate different shapes and sizes of splitter modules 60. For example, the Alcatel splitter referenced in the Background of the Invention section could be incorporated into assembly 10 as splitter module 60.

With reference to FIGS. 5–6, a second embodiment of a splitter assembly is shown as assembly 110. Assembly 110 is designed to be flush mounted with wall 12 in a fashion similar to a conventional telephone wall jack and faceplate assembly. Assembly 110 has housing 128, 120, 112 which is multi-piece in this embodiment, with an exposed surface that comprises in this embodiment front surface 114 of faceplate 112 that is similar in size to a conventional faceplate. Faceplate 112 has back surface 115 opposite front surface 114. Faceplate 112 has mounting holes 116 and opening 118 therethrough. Mounting holes 116 on faceplate 112 are sized and spaced to allow mounting of faceplate 112 to a standard electrical enclosure.

Assembly 110 has jack plate 120 that is mounted to back surface 115 of faceplate 112 and has mating portion 122 that is sized to extend into opening 118. First signal jack 34b' and second signal jack 34c' are mounted in mating portion 122. Mating portion 122 includes jack supports 32b' and 32c' in cavities 35b' and 35c' opening outward in a direction perpendicular to wall 12 when assembly 110 is mounted to wall 12. Jacks 34b' and 34c' have rear sides 37b' and 37c' opposite cavities 35b' and 35c' and are connected to splitter module 60' via lead pairs 219 and 221.

Assembly 110 has open box 128 with open side 130 that attaches to jack plate 120 to be closed by jack plate 120 to create a housing defining an interior 20'. Jack supports 32b' and 32c', and rear sides 37b' and 37c' of jacks 34b' and 34c' extend into interior 20'. Box 128 has tabs 132 that engage windows 134 on edges 136 of jack plate 120.

Splitter module 60' is mounted in interior 20' of housing 15' which comprises at least jack plate 120 and box 128. Box 128 is sized to be received in standard electrical enclosure. First, second and third pairs of terminations 17', 19', 21' are located on the exterior of box 128 and connected to splitter module 60' via lead pairs 117, 119 and 121 that travel along grooves 139 on the exterior of box 128 and pass through notches 239 at open side 130 to enter interior 20'. The wiring of terminations 17', 19', 21' and jacks 34*a*', 34*b*', 34*c*' to splitter module 60' is the same as the wiring of the embodiment of FIGS. 1–2 and alternatively may be configured like the generic schematic of FIG. 1. Similarly to the description above with respect to FIG. 1 and terminations 17, 19 and 21, termination 17' provides a connection for terminating the wire carrying the combined telecommunications signal from the public network or other source, and terminations 19' and 21' allow additional premises wiring to be terminated to the first signal and second signal for routing throughout the premises. Box 128 and jackplate 120 may be advantageously designed to enable potting or sealing the electronics and/or electrical connections against moisture. In a preferred embodiment, cavity 35*c*' and jack 34*c*' are recessed from front surface 114 of faceplace 112. This configuration allows jack 34*c*' to be accessed by a plug whose lead cord is disposed in channel 200. In this manner, a the plug mounted on the back of wall mount telephone may access jack 34*b*' while the telephone is mounted at mounting holes 116 similarly to the wall mounting described above with respect to screws 84 having heads 85 (FIG. 2).

In both the designs of FIGS. 2–3 and 5–6, the enclosure of the electronics and electrical connections within modules 60 and 60' and housings 15 and 128, 120, 112 protects them against damage during handling and installation.

Figure 4C:
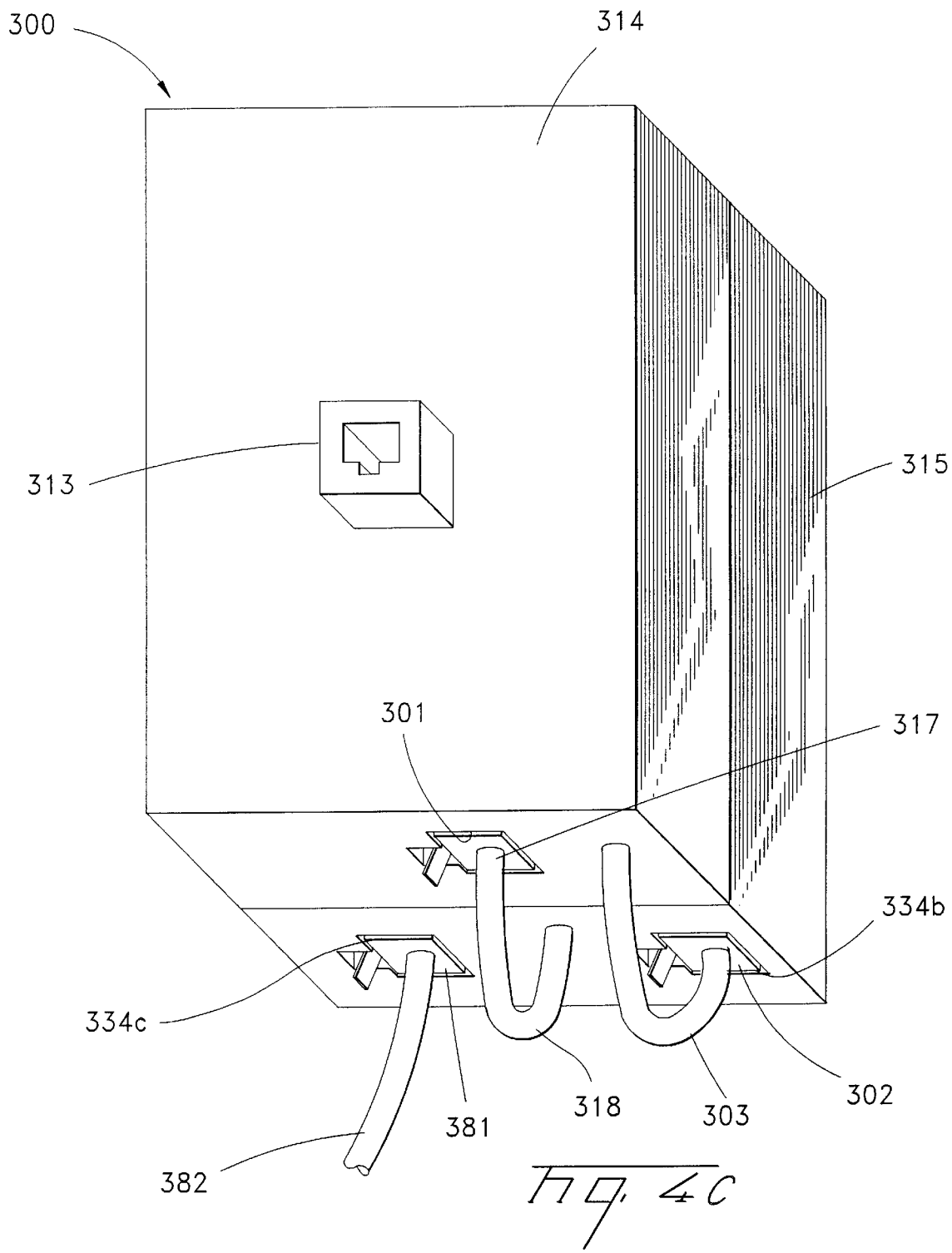
FIG. 4C is a perspective view of devices in FIG. 4B after assembly.

A third embodiment of the present invention is depicted in FIGS. 4A, 4B and 4C. In this embodiment, a "build-out" assembly is provided for installation with an existing premises NID, preferably without disturbing the wiring of the existing NID. It is especially beneficial for premises NIDs wired from the back of the unit inside a wall or other surface.

FIG. 4A depicts a conventional premises NID 300 comprising cover 314 connected to base 320, and including subscriber jack 313, demarcation jack 301 with demarcation plug 302 inserted therein. Plug 302 is attached to demarcation line cord 303. Indoor NID 300 is connected to first wire pair 52, which typically extends from a standard electrical enclosure (not shown). In a typical example base 320 includes mounting holes 350 for mounting to a wall or other surface in a premises, and base 320 and cover 314 include cooperating means (not shown) for attaching cover 314 to base 320 (e.g., snap fitting tabs and slots). In an alternative embodiment, cover 314 may include cover holes corresponding to receptacles (not shown) in base 320 to allow for screw-on installation.

FIGS. 4B and 4C depict the build-out assembly 315 in combination with conventional premises NID 300. Build-out assembly 315 contains splitter circuitry similar to that shown with respect to the first and second embodiments, and is adapted to be mounted by screws through holes 344 (one not shown) to a wall or other surface inside a premises. Build-out assembly 315 includes first signal jack 334*b* and second signal jack 334*c*, as well as loop plug 317 attached to line cord 318, all extending through the exposed surface of the assembly housing for connection as hereinafter described.

The combination is installed as follows. Premises NID 300 is removed from its mounting in the premises (for example, to a wall) and excess length of wire pair 52 is uncoiled from below the mounting. This excess length is inserted into clearance channel 390 of build-out assembly 315 while wire pair 52 remains connected to premises NID 300. Premises NID 300 is then positioned over build-out assembly 315 and both are then positioned over the original mounting location of premises NID 300 and the combination is mounted to a wall or other surface through mounting holes 350 and holes 344. Cover 314 is removed from base 320 during installation.

The installed and connected combination is depicted in FIG. 4C. Demarcation plug 302 of premises NID 300 is inserted in first signal jack 334*b* of build-out assembly 315. Loop plug 317 of build-out assembly 315 is inserted in demarcation jack 301.

In this manner, a combined signal transmitted across wire pair 52 may be connected through premises NID 300 to build-out assembly 315 through demarcation jack 301 to loop plug 317. After suitable splitting by the splitter circuitry in build-out assembly 315, a second signal, or combined signal, depending on the splitter circuitry, is accessible through second signal jack 334*c* by second signal plug 381 attached to second signal line cord 382, which is in turn connected to equipment that receives the second signal, for example, a computer to receive a data signal. A first signal is accessible through subscriber jack 313 which is electrically connected to demarcation plug 302 which is plugged into first signal jack 334*b*. The demarcation function may be carried out by the subscriber either before or after the splitter circuitry, through demarcation jack 301 and first signal jack 334*b*, respectively. The demarcation function may also be carried out by the subscriber for the second signal through second signal jack 334*c*.

Second signal terminations 321 may be located on the cover of build-out assembly 315 (as depicted in phantom in FIG. 4B) for use instead of second signal jack 334*c*. These terminations may preferably comprise screw terminals.

Although the present invention has been described with respect to a preferred embodiment and certain alternative embodiments, it should be understood that various changes, substitutions and modifications may be suggested to one skilled in the art and it is intended that the present invention encompass such changes, substitutions and modifications as fall within the scope of the appended claims. For example, the electrical terminations depicted herein may be replaced with insulation displacement connectors.

That which is claimed is:

1. A premises xDSL signal splitter assembly for receiving a combined telecommunications signal of at least a first signal and a second signal, and adapted to be readily interconnected with premises telephone wiring, the assembly comprising:

(a) a housing adapted for being mounted within the premises, the housing having an exposed surface that is visible when the housing is mounted and a back portion that is not visible when the housing is mounted, the housing defining an interior;

(b) a first, a second and a third pair of electrical terminations, said first pair of electrical terminations adapted to receive said combined telecommunications signal;

(c) a splitter circuit card mounted in the interior of the housing and carrying a first splitter circuit electrically connected in series between the first pair of terminations and the second pair of terminations to pass only the fist signal of the combined signal from the first pair of terminations to the second pair of terminations;

(d) the third pair of terminations electrically connected to a branch point between the first pair of terminations and the first splitter circuit;

(e) a first signal jack extending through the exposed surface of the housing, the first signal jack electrically connected to the second pair of terminations.

2. An assembly according to claim 1 further comprising a second splitter circuit carried on the circuit card and electrically connected in series between the branch point and the third pair of terminations to pass only the second signal of the combined signal from the first pair of terminations to the third pair of terminations.

3. An assembly according to claim 1 further comprising a second signal jack extending through the exposed surface of the housing, the second signal jack electrically connected to the third pair of terminations.

4. An assembly according to claim 3 further comprising a combined signal jack extending through the exposed surface of the housing, the combined signal jack electrically connected to the first pair of terminations.

5. An assembly according to claim 4 wherein the housing comprises a base plate with a back surface for mounting within the premises and an interior surface opposite thereto that faces into the interior of the housing, the base plate having at least one aperture therethrough, and wherein the housing comprises a cover that attaches to the base plate to define the interior between the base plate and the cover.

6. An assembly according to claim 5 wherein at least one of the first signal jack, the second signal jack and the combined signal jack is mounted to the base and wherein the cover has a cut-out for the jack to extend therethrough.

7. An assembly according to claim 3 wherein the second signal jack is a RJ-45 data jack.

8. An assembly according to claim 3 wherein the second signal jack is a RJ-14 data jack.

9. An assembly according to claim 3 wherein the housing further comprises a faceplate that is mountable within the premises, the first signal jack and the second signal jack protruding through said faceplate, the faceplate having a front side comprising said exposed surface and a back side opposite thereto, the housing further comprising a box attached to the back side of the faceplate that extends into a wall when the housing is mounted within the premises, the circuit card mounted inside the box, the box sized to cover over the back of the jacks, the box having an exterior that is located behind the faceplate, the first, the second and the third pairs of terminations located on the exterior side of the box.

10. An assembly according to claim 9 wherein the first signal jack and the second pair of terminations are connected to each other by being connected to second contacts on the circuit card and the second signal jack and the third pair of terminations are connected to each other by being connected to third contacts on the circuit card.

11. An assembly according to claim 9 wherein the faceplate defines an opening and the housing further comprises a jack plate that carries at least said first signal jack in a raised portion, the raised portion of the jack plate dimensioned to be received in the opening.

12. An assembly according to claim 1 wherein the back portion of the housing defines a port sized for passage of a first wire pair carrying said combined telecommunications signal and wherein the first pair of terminations is electrically connected to said first wire pair.

13. An assembly according to claim 1 wherein the first signal jack is a RJ-11 telephone jack.

14. An assembly according to claim 1 wherein said first, second and third pairs of electrical terminations and said splitter card are protected by said housing from damage during installation.

15. An assembly according to claim 1 further comprising means for sealing said first, second and third pairs of electrical terminations and said splitter circuit card against moisture.

16. An assembly according to claim 1, wherein said assembly further comprises a build-out assembly adapted for mounting in combination with a premises NID.

17. An assembly according to claim 16, further comprising a clearance channel for receiving a first wire pair carrying said combined telecommunications signal.

18. An assembly according to claim 16, further comprising a second signal jack extending through the exposed surface of the housing, the second signal jack electrically connected to the third pair of electrical terminations.

19. An assembly according to claim 18, further comprising a combined signal plug attached to a line cord extending through the exposed surface of the housing.

20. The assembly of claim 19, further comprising a premises NID including a subscriber jack, a demarcation plug and a demarcation jack, wherein said build-out assembly is mounted in combination with said premises NID, said combined signal plug is inserted in said demarcation jack, and said demarcation plug is inserted in said first signal jack.

21. A premises xDSL signal splitter assembly for receiving a combined telecommunications signal of at least a first signal and a second signal, and adapted to be readily interconnected with premises telephone wiring, the assembly comprising:

(a) a housing adapted for being used within the premises, the housing defining an interior;

(b) a first, a second and a third pair of electrical terminations, said first pair of electrical terminations adapted to receive said combined telecommunications signal;

(c) a splitter circuit card mounted in the interior of the housing and carrying a first splitter circuit electrically connected in series between the first pair of terminations and the second pair of terminations to pass only the first signal of the combined signal from the first pair of terminations to the second pair of terminations;

(d) the third pair of terminations electrically connected to a branch point between the first pair of terminations and the first splitter circuit;

(e) a first signal jack extending through the housing, the first signal jack electrically connected to the second pair of terminations.

22. An assembly according to claim 21 further comprising a second splitter circuit carried on the circuit card and electrically connected in series between the branch point and the third pair of terminations to pass only the second signal of the combined signal from the first pair of terminations to the third pair of terminations.

23. An assembly according to claim 21 further comprising a second signal jack extending through the housing, the second signal jack electrically connected to the third pair of terminations.

24. An assembly according to claim 23 further comprising a combined signal jack extending through the housing, the combined signal jack electrically connected to the first pair of terminations.

25. A method of readily interconnecting an xDSL signal splitter with premises telephone wiring having a first wire pair for carrying a combined signal of at least a first signal and a second signal, the method comprising the steps of:

(a) mounting a signal splitter assembly within the premises, the splitter assembly comprising: (i) a housing, the housing having exposed surface that is visible when the assembly is mounted to the wall and a back portion that is not visible when the assembly is mounted to the wall, the housing defining an interior; (ii) a first, a second and a third pair of electrical terminations associated with the housing; (iii) a splitter circuit card mounted in the interior of the housing and carrying a first splitter circuit electrically connected in series between the first pair of terminations and the second pair of terminations to pass only the first signal of the combined signal from the first termination to the second pair of terminations, the third pair of terminations electrically connected to a branch point between the first pair of terminations and the first splitter circuit; and, (iv) a first signal jack extending through the exposed surface of the housing, the first signal jack electrically connected to the second pair of terminations;

(b) connecting the first wire pair to the first pair of terminations; and (c) inserting a telecommunications plug into the first signal jack.

26. The method of claim 25 further comprising the step of mounting a telephone over the signal splitter assembly, and wherein said telecommunications plug comprises a telephone plug for said telephone.

27. The method of claim 25 wherein the splitter assembly further comprises a combined signal jack connected to the first pair of terminations and wherein the step of connecting the first wire pair to the first pair of terminations comprises installing a jumper from an existing wall jack to the combined signal jack.

28. The method of claim 25 wherein the splitter assembly further comprises a second signal jack connected to the third pair of terminations and further comprising the step of inserting a data plug into the second signal jack.

29. The method of claim 25, wherein said signal splitter assembly further comprises a build-out assembly adapted for mounting in combination with a premises NID, said premises NID includes a subscriber jack and a demarcation plug electrically connected thereto and a demarcation jack electrically connected to said first wire pair, said built-out assembly further comprising a loop plug electrically connected to said first pair of terminations by a loop line cord, and wherein said connecting step further comprises inserting said loop plug into said demarcation jack, and said inserting step further comprises inserting said demarcation plug into said first signal jack.

* * * * *